(12) United States Patent
Bosco et al.

(10) Patent No.: US 9,233,577 B2
(45) Date of Patent: Jan. 12, 2016

(54) HUB-BEARING ASSEMBLY FOR A MOTOR VEHICLE WHEEL

(71) Applicants: Domenico Bosco, Borgaro Torinese (IT); Ajay Thanwal, Bangalore (IN)

(72) Inventors: Domenico Bosco, Borgaro Torinese (IT); Ajay Thanwal, Bangalore (IN)

(73) Assignee: AKTIEBOLAGET SKF, Gothenburg (SE)

( * ) Notice: Subject to any disclaimer, the term of this patent is extended or adjusted under 35 U.S.C. 154(b) by 286 days.

(21) Appl. No.: 13/857,238

(22) Filed: Apr. 5, 2013

(65) Prior Publication Data

US 2013/0292995 A1  Nov. 7, 2013

(30) Foreign Application Priority Data

Apr. 6, 2012 (IT) .............................. TO2012A0309

(51) Int. Cl.
*B60B 27/00* (2006.01)
*F16C 33/80* (2006.01)
*F16J 15/32* (2006.01)
*F16C 19/18* (2006.01)
*F16C 33/78* (2006.01)

(52) U.S. Cl.
CPC ......... *B60B 27/0052* (2013.01); *B60B 27/0073* (2013.01); *F16C 33/805* (2013.01); *F16J 15/3232* (2013.01); *B60B 27/00* (2013.01); *B60B 27/0005* (2013.01); *B60B 27/0026* (2013.01); *B60B 27/0084* (2013.01); *B60B 27/0094* (2013.01); *B60B 2900/211* (2013.01); *B60B 2900/321* (2013.01); *F16C 19/186* (2013.01); *F16C 33/7876* (2013.01); *F16C 2326/02* (2013.01)

(58) Field of Classification Search
CPC  B60B 27/00; B60B 27/0026; B60B 27/0052; B60B 27/0094; B60B 27/0005
USPC .............. 301/6.8, 37.105; 384/478, 477, 488, 384/589
See application file for complete search history.

(56) References Cited

U.S. PATENT DOCUMENTS

| | | | | |
|---|---|---|---|---|
| 2,991,005 A | * | 7/1961 | Hall ................................ | 415/68 |
| 4,243,234 A | * | 1/1981 | Blaha ............................ | 277/364 |
| 2005/0062335 A1 | * | 3/2005 | Odell ....................... | 301/37.101 |
| 2007/0076994 A1 | * | 4/2007 | Norimatsu et al. ........... | 384/486 |
| 2011/0148182 A1 | * | 6/2011 | Walter et al. ................ | 301/105.1 |
| 2011/0182538 A1 | * | 7/2011 | Langer et al. ................. | 384/484 |
| 2011/0221142 A1 | * | 9/2011 | Wang et al. ................... | 277/549 |

FOREIGN PATENT DOCUMENTS

| | | |
|---|---|---|
| DE | 102008038682 A1 | 2/2010 |
| DE | 102008051065 A1 | 4/2010 |
| EP | 1770296 A1 | 4/2007 |

* cited by examiner

*Primary Examiner* — S. Joseph Morano
*Assistant Examiner* — Jean Charleston
(74) *Attorney, Agent, or Firm* — Bryan Peckjian; SKF USA Inc. Patent Dept.

(57) ABSTRACT

A hub-bearing assembly (10) for a motor vehicle wheel is provided with a flanged hub (12), a disc brake rotor (40) and a disc-shaped sealing shield (50) having a radially inner mounting portion (51, 51') mounted with radial interference on a cylindrical surface (30) of the stationary bearing ring (14), a shaped wall (52, 52') extending radially from an axially inner end (53) of the mounting portion (51), and an outer, peripheral sealing edge (54) defining a labyrinth seal with a surface (46) of the disc brake rotor.

7 Claims, 2 Drawing Sheets

HUB-BEARING ASSEMBLY FOR A MOTOR VEHICLE WHEEL

FIELD OF THE INVENTION

The present invention relates to a shielded hub-bearing assembly for a motor vehicle wheel. The invention is intended to be used in particular on motor vehicles where the hub is exposed to particularly severe conditions as regards the presence of water, mud and debris with which the hub may come into contact.

BACKGROUND OF THE INVENTION

U.S. 2011/0221142 A1 discloses a hub-bearing assembly of the type defined in the preamble of claim 1, which has an axis of rotation and comprises:
- a flanged hub rotatable about the axis of rotation, the hub having a flange integral therewith and transverse to the axis of rotation, the flange having a plurality of angularly spaced axial bores for a corresponding plurality of bolts for fastening a disc brake rotor and a wheel to the flanged hub;
- a stationary bearing ring arranged radially on the outside of the flanged hub, the ring forming a projecting tubular portion which extends in an axially outer direction and has a radially outer surface of axial cylindrical shape;
- a disc brake rotor fixed to the flange of the hub, the rotor having a surface facing said cylindrical surface of the ring;
- at least one sliding contact sealing device mounted between the tubular projecting portion, the outer ring and the flanged hub.

SUMMARY OF THE INVENTION

A main object of the invention is to provide a greater degree of protection for the assemblies of the aforementioned type, in particular so as to prolong their working life, preventing the contaminating agents (water, mud, debris) from penetrating into the inner parts of the bearing and reducing the efficiency of the rolling members and the rolling tracks.

Another object of the invention is to allow rapid evacuation of the water and any other liquid substances which may have penetrated into the annular chamber defined between the outer ring of the bearing, the brake disc and the hub flange to which the wheel of the vehicle is fastened.

A further object of the invention is to provide a sealing shield with a simple design which allows the aforementioned objects to be achieved in an effective and low-cost manner.

These and other objects and advantages are achieved, according to the invention, by a shielded assembly having the characteristic features defined in claim 1. Preferred embodiments of the invention are defined in the dependent claims.

In brief, a hub-bearing assembly for a motor vehicle wheel is proposed, the assembly being characterized in that it comprises, in addition to the aforementioned sealing device, a disc-shaped sealing shield which has a radially inner mounting portion of cylindrical shape mounted with radial interference on a cylindrical surface of the outer ring of the bearing, a wall extending substantially radially, obliquely or transversely with respect to the axis of rotation from an axially inner end of the mounting portion, and a radially outer, peripheral sealing edge acting as a labyrinth seal with the aforementioned facing surface of the brake rotor.

The shield forms an additional barrier arranged upstream of the standard sealing device normally provided between the stationary outer ring of the bearing and the rotating inner hub. As a result of this shield it is possible to obtain additional protection which prevents the more coarse debris from coming into contact with the sealing device and damaging it.

BRIEF DESCRIPTION OF THE DRAWINGS

Two preferred embodiments of the invention will now be described, said embodiments being provided by way of example with reference to the accompanying drawings in which.

DETAILED DESCRIPTION OF PREFERRED EMBODIMENTS

Figure 1:
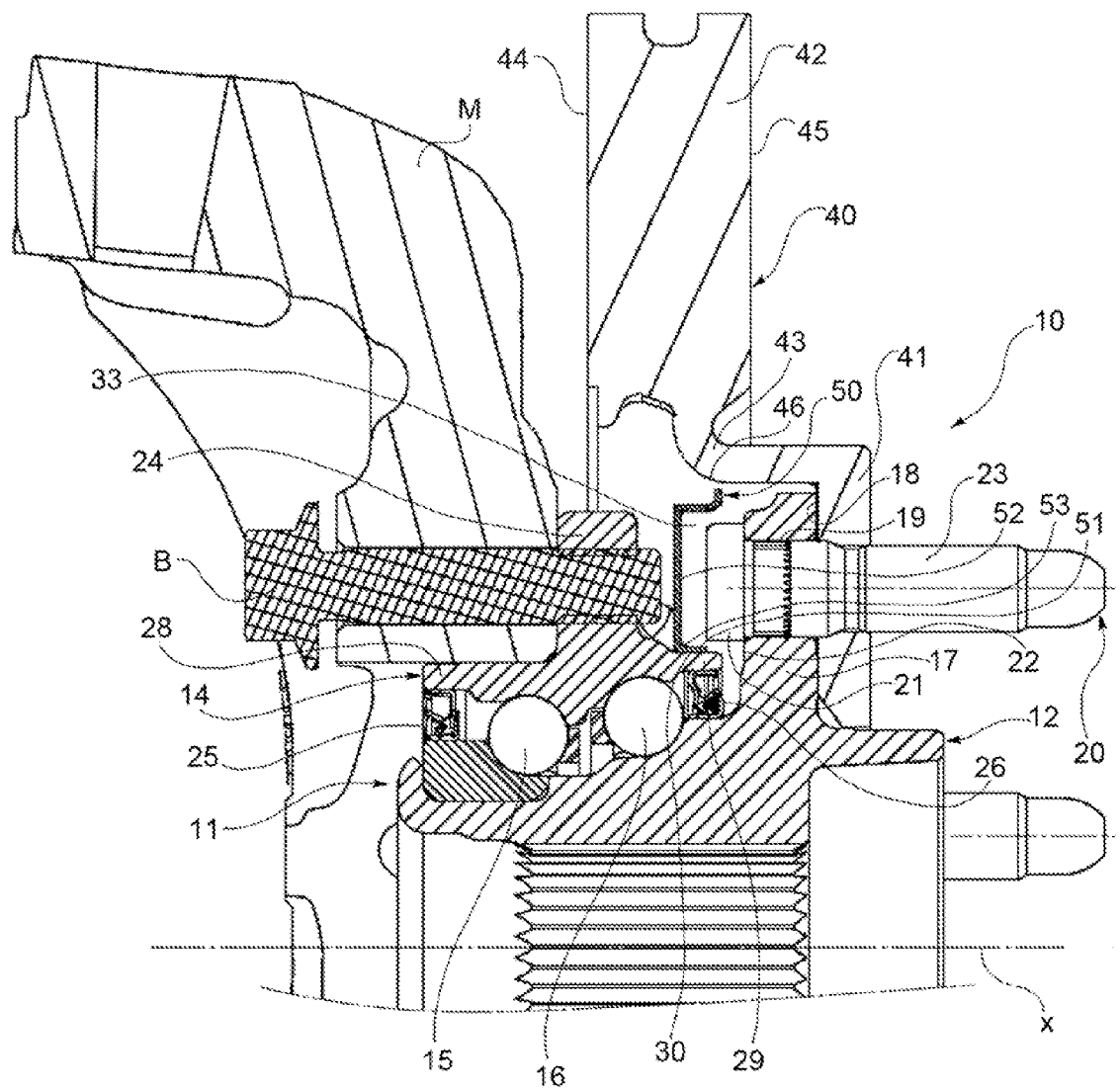
FIG. 1 is a partial axially sectioned view of a shielded assembly according to a first embodiment of the invention.

With reference initially to FIG. 1, an assembly provided in accordance with a first embodiment of the invention is denoted overall by 10. The assembly 10 comprises a hub-bearing unit 11, a disc brake rotor 40 and an annular sealing shield or "flinger" 50.

The hub-bearing unit 11 is used to mount rotatably a wheel (not shown) on an upright M of the suspension of a vehicle, about a central axis of rotation x. In the whole of the present description and in the attached claims, terms and expressions indicating positions and directions, such as "radial" and "axial", are to be understood as referring to the axis of rotation x of the assembly. Expressions such as "axially inner" and "axially outer" are instead understood as referring to the condition mounted on the vehicle.

The hub-bearing assembly 10 includes a flanged hub 12 rotatable about the axis x, a flange 13 integral with the flanged hub 12 and transverse to the axis x, a stationary ring 14 arranged radially on the outside of the flanged hub 12, and two rings 15, 16 of rolling members arranged between the outer stationary ring and the flanged hub. In this example, the rolling members of the two rings 15, 16 are balls arranged between the stationary ring 14 and the flanged hub 12 in the configuration of an angular-contact bearing having a dual set of bearing balls. The rings 15, 16 have, in the example shown in FIG. 1, respective pitch circles with respective diameters of different sizes. The invention is not to be regarded as limited to this configuration and may in particular be implemented also in hub-bearing assemblies having rolling members with a different shape, for example tapered rollers, or having rings of rolling members with pitch circles of the same diameter.

The hub 12 forms a flange 17 which extends radially outwardly and has a flat radial surface 18, on the axially outer side, which defines a flat and precise, radial, reference surface against which the brake disc 40 and the wheel (not shown) rest. The flange 17 has, formed therein, through-bores 19 for receiving bolts 20 having a head 21 which bears against the axially inner radial surface 22 of the flange 17. The shanks 23 of the bolts pass through a radially inner mounting flange 41 forming part of the disc brake rotor 40.

The outer ring 14 of the bearing unit has, in a manner known per se, a radially outer flange 24 for fixing to the upright M of the vehicle suspension by means of further fixing bolts B. Two sliding contact sealing devices 25, 26, with respective sliding contact sealing lips, are provided at the opposite axial ends of the outer ring 14: a first sealing device 26 on the outboard side between the outer ring 14 and the hub 12, and a second sealing device 25 on the inboard side, between the outer ring 14 and annular insert 25 which is inserted in a tubular portion 28 of the hub 12 and forms integrally a radially inner rolling track for the ring 15 of rolling members arranged on the axially outer side (or outboard side).

The disc brake rotor 40 has, in a manner known per se, a braking portion 42 having opposite braking surfaces 44, 45 oriented in parallel planes transverse to the axis x, and an intermediate connecting portion 43 which joins the mounting flange 41 to the braking portion 42. The connecting portion 43 has a surface 46 facing the outer ring 14, in this example a surface connected in a curved manner.

The outer ring 14 forms, in a manner known per se, a projecting tubular portion 29 (known in the sector by the term "spigot") which extends in an axially outer direction and has a radially outer surface 30 of axial cylindrical shape.

The shield 50, viewed as a whole, is in the form of a body with a substantially annular shape, preferably made of stainless steel or any other metallic or non-metallic material resistant to the corrosive action of the external environment, which forms a radially inner mounting portion 51 of cylindrical shape, mounted with radial interference on the axially outer cylindrical surface 30 of the tubular portion or spigot 29 of the outer ring 14. The shield 50 furthermore has a shaped wall 52 extending in a substantially radial, oblique or transverse manner with respect to the axis x from an axially inner end 53 of the mounting portion 51.

The shaped wall 52 extends radially or obliquely outwards in the direction of the disc brake rotor 40, maintaining an axial distance from the flange 17 of the hub such as not to interfere with the heads 21 of the bolts 20 when the hub is rotating about the axis x.

The shield 50 comprises a cylindrical wall 56 integral with the shaped wall 52 and coaxially outer with respect to the mounting portion 51. In this example, the cylindrical wall 56 has an axial length greater than the axial length of the mounting portion 51. The shield 50 comprises a radially outer peripheral sealing edge 54, which is folded from the cylindrical wall 56 and extends from the latter into the vicinity of the disc brake rotor 40, in the present example into the vicinity of the surface 46 of the latter. The edge 54 thus acts as a labyrinth seal with the brake disc. The surface 46 is advantageously the part of the disc brake rotor 40 closest to the outer ring 14 of the bearing so as to reduce to a minimum and optimize the dimensions of the shield 50. The outer edge 54 of the shield terminates at about 0.1 to 5 mm from the surface 46 of the brake disc, so as to prevent the entry of rough debris as well as water spray or mud into the annular chamber 33 defined by the two facing flanges 24 and 17 of the rings of the bearing unit, by the brake disc 40 and by the sealing device 26. The axial length of the cylindrical wall 56 is chosen so as to position the free end of the edge 54 at a suitable distance from the surface 46 of the rotor 40 so that the shield acts as an effective labyrinth seal.

Preferably, the shield 50 has a drainage opening 55 (FIG. 2) which, in the mounted condition of the shield, is located at the lowest possible point so as to allow complete evacuation of any contaminating agents which may have penetrated inside the zone protected by the shield 50. The drainage opening 55 has a dual function: allow the evacuation of any contaminating agents and also allow the removal of the bolts 20, by passing them through the said opening 55.

Figure 2:
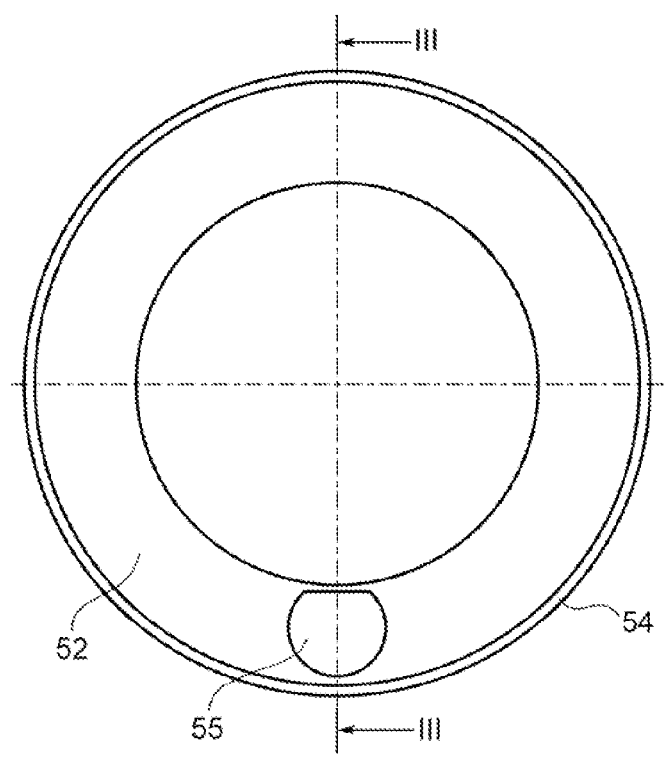
FIG. 2 is a front view of annular shield included in the assembly according to FIG. 1.
Figure 3:
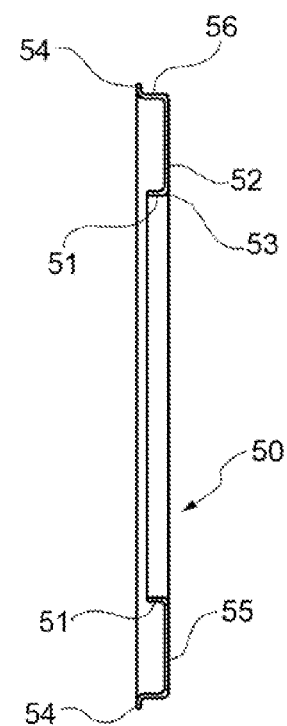
FIG. 3 shows an axially sectioned view of the shield according to FIG. 2, along the cross-sectional line III-III.
Figure 4:
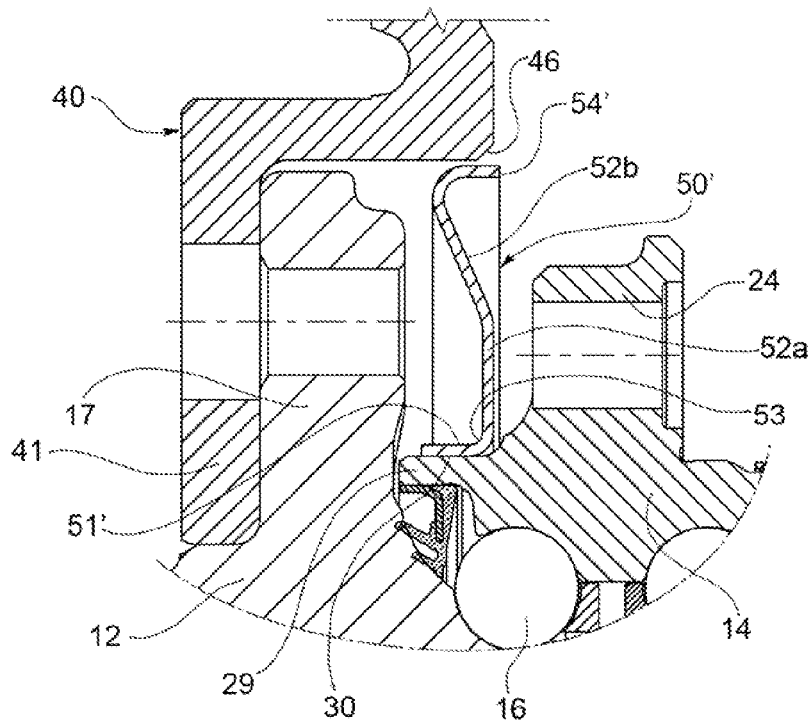
FIG. 4 is an axially sectioned partial view of a second embodiment of a shielded assembly according to the invention.

In the alternative embodiment shown in FIG. 4, the annular shield, denoted by 50', has a substantially Z-shaped overall form which differs from that of the example shown in FIGS. 1-3 owing to the configuration of its radially outer part and the outer peripheral edge 54.

In the example according to FIG. 4, the shield 50' has the following portions:
- a radially inner mounting portion 51' of cylindrical shape, mounted with radial interference on the axially outer cylindrical surface 30 of the tubular portion or spigot 29 of the outer ring 14;
- a shaped wall 52' with a radial section 52a and a conical section 52b;
- a sealing edge 54' folded so as to form a substantially cylindrical, radially outer peripheral portion which extends in an axially inner direction.

It can be understood that the shield 50, 50' provides a degree of additional protection which prevents the coarser debris from coming into contact with the sealing device 26. The labyrinth seal also prevents the entry of water spray and mud. The intact condition of the sealing device 26 ensures and favours the efficiency and prolongs the working life of the whole assembly.

While a few exemplary embodiments have been disclosed in the foregoing detailed description, it should be noted that there exist a vast number of variations of shields having sealing edges which may be shaped differently (for example having an L-shaped cross section), depending on the shape of the brake disc with which the labyrinth seal is to be formed. It should also be noted that the exemplary embodiments are only illustrative examples and are not intended to limit the scope, applicability or configuration in any way. Rather, the foregoing summary and detailed description will provide those skilled in the art with a convenient guide for implementing at least one exemplary embodiment, it being understood that various changes may be made to the function and arrangement of elements described in the exemplary embodiments without departing from the scope as set forth in the appended claims and their legal equivalents.

The invention claimed is:

1. A hub-bearing assembly for a motor vehicle wheel, the hub-bearing assembly having an axis of rotation and comprising:
   a flanged hub rotatable about the axis of rotation, the flanged hub having a flange and a hub, the flange being integral with the hub and transverse to the axis of rotation, the flange having a plurality of angularly spaced axial bores for a corresponding plurality of bolts for fastening a disc brake rotor and a wheel to the flanged hub;
   a stationary bearing ring arranged radially on the outside of the flanged hub, the stationary bearing ring forming a projecting tubular portion which extends in an axially outer direction and has a cylindrical surface;
   a disc brake rotor fixed to the flange of the flanged hub, the disc brake rotor having a surface facing the cylindrical surface of the stationary bearing ring, the disc brake rotor having a braking portion, a mounting flange mounted adjacent to the flange of the flanged hub, and an intermediate connecting portion joining the mounting flange to the braking portion;
   at least one sliding contact sealing device mounted between the projecting tubular portion of the stationary bearing ring and the flanged hub; and
   a disc-shaped sealing shield having:
     a radially inner mounting portion of cylindrical shape, mounted with radial interference on the cylindrical surface of the stationary bearing ring, a shaped wall extending substantially radially or transversally with respect to the axis of rotation from an axially inner end of the radially inner mounting portion, and a radially outer, peripheral sealing edge defining a labyrinth seal with the surface of the disc brake rotor, wherein the surface of the disc brake rotor is a surface of the disc brake rotor which is closest to the stationary bearing ring and extends on the intermediate connecting portion defining the labyrinth seal with the radially outer, peripheral sealing edge.

2. The hub-bearing assembly according to claim 1, wherein the disc-shaped sealing shield further comprises a cylindrical wall integral with the shaped wall and coaxially outer with respect to the radially inner mounting portion, and wherein the radially outer, peripheral sealing edge is folded from the cylindrical wall.

3. The hub-bearing assembly according to claim 1, wherein the shaped wall comprises a first, radially inner section which extends in a radial plane and a second, radially outer section having a conical shape and being inclined obliquely towards the disc brake rotor.

4. The hub-bearing assembly according to claim 3, wherein the radially outer, peripheral sealing edge is folded so as to form a substantially cylindrical, radially outer peripheral portion extending in an axially inner direction.

5. The hub-bearing assembly according to claim 1, wherein the disc-shaped sealing shield is made of stainless steel.

6. The hub-bearing assembly according to claim 1, wherein the disc-shaped sealing shield has a drainage opening and that, in a mounted condition, the disc-shaped sealing shield is oriented angularly so as to position the drainage opening as low as possible within the hub-bearing assembly.

7. A disc-shaped sealing shield disposed within a hub-bearing assembly for a motor vehicle wheel, the hub-bearing assembly having an axis of rotation and comprising:

a flanged hub rotatable about the axis of rotation, the flanged hub having a flange and a hub, the flange being integral with the hub and transverse to the axis of rotation, the flange having a plurality of angularly spaced axial bores for a corresponding plurality of bolts for fastening a disc brake rotor and a wheel to the flanged hub;

a stationary bearing ring arranged radially on the outside of the flanged hub, the stationary bearing ring forming a projecting tubular portion which extends in an axially outer direction and has a cylindrical surface;

a disc brake rotor fixed to the flange of the flanged hub, the disc brake rotor having a surface facing the cylindrical surface of the stationary bearing ring, the disc brake rotor having a braking portion, a mounting flange mounted adjacent to the flange of the flanged hub, and an intermediate connecting portion joining the mounting flange to the braking portion; and at least one sliding contact sealing device mounted between the projecting tubular portion of the stationary bearing ring and the flanged hub;

the disc-shaped sealing shield comprising:

a radially inner mounting portion of cylindrical shape, mounted with radial interference on the cylindrical surface of the stationary bearing ring, a shaped wall extending substantially radially or transversally with respect to the axis of rotation from an axially inner end of the radially inner mounting portion, and a radially outer, peripheral sealing edge defining a labyrinth seal with the surface of the disc brake rotor, wherein the surface of the disc brake rotor is a surface of the disc brake rotor which is closest to the stationary bearing ring and extends on the intermediate connecting portion defining the labyrinth seal with the radially outer, peripheral sealing edge.

* * * * *